July 15, 1952  W. HASEMAN  2,603,031

FISHING TRAP

Filed July 13, 1950  2 SHEETS—SHEET 1

Inventor
Walter Haseman

By *Clarence A. O'Brien and Harvey B. Jacobson*
Attorneys

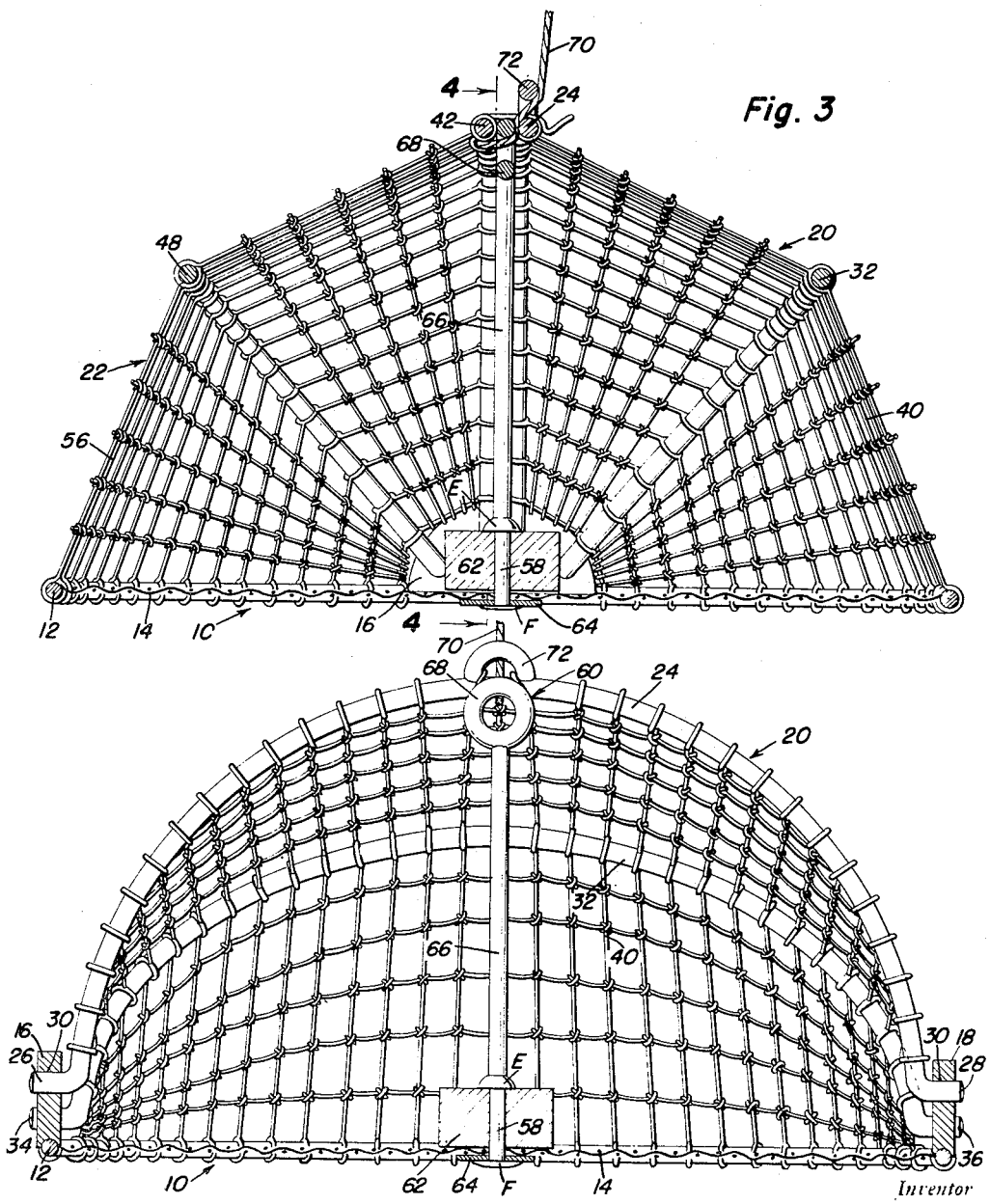

Patented July 15, 1952

2,603,031

UNITED STATES PATENT OFFICE 2,603,031

FISHING TRAP

Walter Haseman, Evansville, Ind., assignor of one-half to Charles R. Jones, Evansville, Ind.

Application July 13, 1950, Serial No. 173,510

7 Claims. (Cl. 43—105)

This invention relates to new and useful improvements in fishing traps and the primary object of the present invention is to provide a pair of bellows-like members mounted upon a base and which are raised from the base and toward each other to form an enclosure by an actuating line slidably carried by one of the members.

Another important object of the present invention is to provide a fishing trap of the aforementioned character involving a guide rising from the base and located between the members and which slidably receives the line to prevent fish from becoming entangled with the line when the bellows-like members are folded against the base.

A further object of the present invention is to provide a spring clip attached to one of the bellows-like members and which will yieldingly engage the other bellows-like member to hold the members raised and engaged.

A still further aim of the present invention is to provide a fishing trap that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged vertical central sectional view through the bellows-like members and showing the members raised and locked in their raised position; and, Figure 4 is a vertical sectional view taken substantially on the plane of section line 4—4 of Figure 3.

Figure 1:
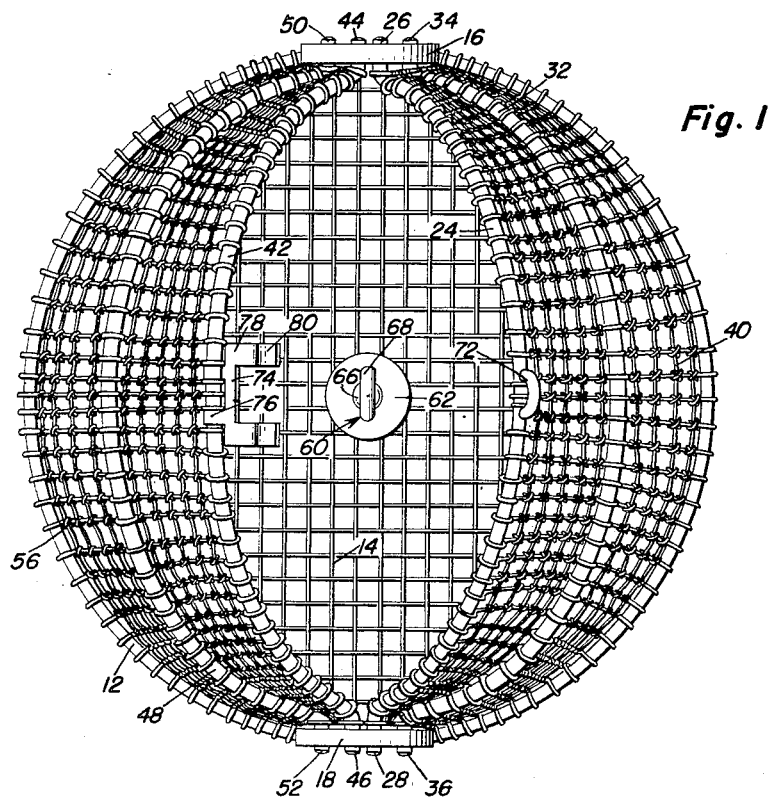
Figure 1 is a plan view of the present invention showing the bellows-like members partially raised and the actuating line removed.
Figure 2:
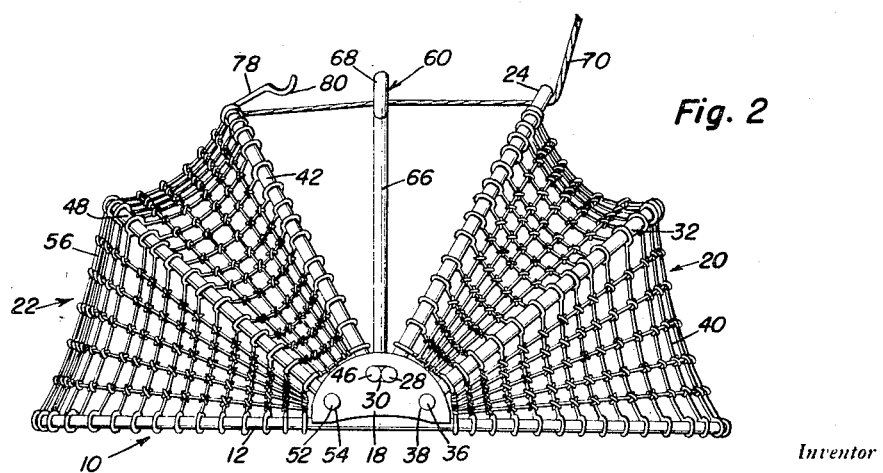
Figure 2 is an elevational view of Figure 1 and showing the line applied to the bellows-like members.

Referring now to the drawings in detail, wherein for the purpose of illustration, there is disclosed a preferred embodiment of the present invention, the numeral 10 represents a circular base composed of a circular bent bar 12 and a screen wall 14 attached by any suitable means to the bar 12.

A pair of ears 16 and 18 rise from diametrically opposite sides of the base and are suitably attached to the bar 12.

A pair of bellows-like members 20 and 22 coact with the base 10 to form an enclosure. The member 20 includes an inner U-shaped or arcuate bar 24 whose out-turned ends 26 and 28 extend through central slots 30 in the ears 16 and 18, an outer U-shaped arcuate bar 32 whose out-turned end portions 34 and 36 extend through apertures 38 in the ears 16 and 18, and a net material or flexible netting 40 that is anchored to the bars 24, 32 and the base 10.

The member 22 is similar to the member 20 since it also includes an inner U-shaped or arcuate bar 42 whose out-turned ends 44 and 46 extend through the slots 30, an outer U-shaped or arcuate bar 48 whose out-turned ends 50 and 52 extend through apertures 54 in the ears 16 and 18, and a net material or flexible netting 56 that is anchored to the bars 42, 48 and the base 10.

The bar 32 is so anchored to the netting 40 that it will be located substantially midway between the base 10 and the bar 24 when the member 20 is expanded and raised, and the bar 48 is so anchored to the netting 56 that it will be located substantially midway between the base 10 and the bar 42 when the member 22 is expanded and raised, as shown in Figure 3.

The lower end 58 of a guide 60 extends through a block 62 and the center of the wall 14 and the lower extremity of the end 58 is flattened, as at F, against a washer 64 on the wall 14, so that the block 62, wall 14 and washer 64 will be clamped between the flattened portion F and an enlargement E on the end 58 to retain the guide in an upright position centrally on the base. The guide includes a shank 66 and an eye 68 permanently attached to the upper end of the shank 66 and the eye 68 will lie between the bars 24 and 42 when the members 20 and 22 are raised, as shown in Figure 3.

A flexible element or actuating line 70 is slidably received by a lop 72 attached centrally to the bar 24 and is also slidably received by the eye 68. One end of the line 70 is attached to the center of the bar 42 so that as the line 70 is pulled upwardly, the members 20 and 22 will be raised and expanded toward each other.

Means is provided for locking or retaining the members 20 and 22 expanded to form with the base 10 an enclosure, and this means comprises a resilient U-shaped member or clip 74 that is attached centrally to the bar 42 by gripping tongues 76 which embrace and grip the bar 42. The member 74 projects laterally from the bar 42 and its spaced fingers 78 are formed with detents 80 that will ride over the bar 24 to yieldingly retain the bars 24 and 42 together, as the members 20 and 22 are expanded by an upward pull on the line 70.

In practical use of the present invention, as the trap is lowered against the bottom of a body of water and pressure on the line 70 released, the members 20 and 22 will fan outwardly and lie upon the base. Suitable bait is mounted on the base and when fish strike the bait, the user pulls upwardly on the line 70 to expand the members 20 and 22 and to lock the members 20 and 22 together. Then the trap is raised by the line 70.

Obviously, the base may be square, rectangular or any other shape with the ears 16 and 18 opposing each other and with the members 20 and 22, as well as their bars, shaped to form an enclosure with the base. Also, additional bars forming the bellows-like members may be employed on larger models and when the space between adjacent bars is to be reduced to prevent a fish from tearing a weakened netting.

The bars 24, 32, 42 and 48 are semi-circular and are so mounted on the base to form a hemisphere, but the bars may be distinctly U-shaped without disturbing the function of the invention.

The netting may be of any suitable type or material and may comprise strong gauze of flexible wire or cloth although the string type netting is quite satisfactory in use and does not tend to restrict fish from approaching the trap.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing trap comprising a circular base, a pair of ears rising from diametrically opposite sides of the base, a plurality of arcuate bars terminally pivoted to said ears for swinging toward and away from the base, said bars including an inner pair of bars and an outer pair of bars, a flexible mesh material attached to the base and also attached to one of the outer bars and one of the inner bars, another flexible mesh material attached to the base and also attached to the other outer bar and the other inner bar, a guide rising centrally from the base, a single flexible actuating cord slidably carried under one of the inner bars and attached to the other inner bar for moving the inner bars toward each other, said cord also being slidably carried by said guide, and inner connecting means between said inner bars for retaining the inner bars raised and in juxtaposition.

2. A fishing trap comprising a circular base, a pair of ears rising from diametrically opposite sides of the base, a plurality of arcuate bars terminally pivoted to said ears for swinging toward and away from the base, said bars including an inner pair of bars and an outer pair of bars, a flexible mesh material attached to the base and also attached to one of the outer bars and one of the inner bars, another flexible mesh material attached to the base and also attached to the other outer bar and the other inner bar, a guide rising centrally from the base, a flexible actuating element slidably carried by one of the inner bars and attached to the other inner bar for moving the inner bars toward each other, said element also being slidably carried by said guide, and means carried by one of the inner bars for engaging the other inner bar and adapted to retain the inner bars in juxtaposition during the raising of the bars by the element.

3. The combination of claim 2 wherein said means includes a resilient U-shaped member having spaced fingers and detents provided in said fingers for riding over said other of the inner bars.

4. A fishing trap comprising a base, a pair of bellows-like members mounted on the base and movable toward and away from each other, a guide including a post fixed to and extending upwardly from the base between the members, and a single flexible cord having an end portion slidably carried by one of said members and said guide and attached to the other of said members for urging the members toward each other.

5. A fishing trap comprising a base, a pair of bellows-like members mounted on the base and movable toward and way from each other, a guide having a vertical post fixed to and extending upwardly from the base between the members, a single cord having an end portion slidably carried by one of said members and said guide and attached to the other of said members for urging the members toward each other, and spring means carried by one of said members for engaging the other of said members to yieldingly hold the members engaged with each other.

6. A fishing trap comprising a base, a pair of opposed ears rising from the base, first and second inner U-shaped bars terminally pivoted to the ears, first and second outer U-shaped bars terminally pivoted to the ears, a netting attached to the first inner and outer bars and also attached to said base, another netting attached to the second inner and outer bars and also attached to the base, a line having an end portion slidably carried beneath the first inner bar and attached to the second inner bar for moving the inner bars toward each other, and a guide extending upwardly and centrally from the base and slidably receiving the line thereby tending to prevent fish from becoming entangled in the line when the bars are pivoted toward the base.

7. A fishing trap comprising a base, a pair of opposed ears rising from the base, first and second inner U-shaped bars terminally pivoted to the ears, first and second outer U-shaped bars terminally pivoted to the ears, a netting attached to the first inner and outer bars and also attached to said base, another netting attached to the second inner and outer bars and also attached to the base, a line slidably carried by the first inner bar and attached to the second inner bar for moving the inner bars toward each other, a guide extending upwardly and centrally from the base and slidably receiving the line, thereby tending to prevent fish from becoming entangled in the line when the bars are pivoted toward the base, and a resilient U-shaped member attached to one of the inner bars for yieldingly engaging the other inner bar to hold the inner bars together, said member including spaced fingers adapted to overlie the guide when the inner bars are held together.

WALTER HASEMAN.

REFERENCES CITED

The following references are of record in the file of this patent:

UNITED STATES PATENTS

| Number | Name | Date |
| --- | --- | --- |
| 708,380 | Merle | Sept. 2, 1902 |
| 850,289 | Bright | Apr. 16, 1907 |
| 1,161,186 | Butcher | Nov. 23, 1915 |
| 1,262,507 | Johnston | Apr. 9, 1918 |

FOREIGN PATENTS

| Number | Country | Date |
| --- | --- | --- |
| 24,348 | France | June 20, 1922 |